March 14, 1950     A. G. FORSYTH     2,500,811
INTERLOCKING THROTTLE AND PROPELLER PITCH
CHANGING CONTROL FOR AIRCRAFT
Filed Dec. 13, 1944     4 Sheets-Sheet 1

Inventor
ARCHIBALD GRAHAM FORSYTH,
By Robert B. Pearson
Attorney

Patented Mar. 14, 1950

2,500,811

UNITED STATES PATENT OFFICE 2,500,811

INTERLOCKING THROTTLE AND PROPELLER PITCH CHANGING CONTROL FOR AIRCRAFT

Archibald Graham Forsyth, Cheam, England, assignor to The Fairey Aviation Company Limited, Hayes, Middlesex, England Application December 13, 1944, Serial No. 567,990

16 Claims. (Cl. 170—135.74)

This invention relates to a control mechanism for aircraft in which movements of the throttle control lever also control in part the variable pitch propeller system, and the invention in particular provides what is termed "instinctive" control.

By "instinctive" control it is meant that when, in accordance with conditions of flight a change to a particular pitch is to be effected quickly, the pilot, in moving the throttle control lever in the direction instinctively called for by the particular operating condition, will effect such a pitch change.

By way of example, when the aircraft is coming in to land and it is desired to employ a reverse pitch setting for braking, the pilot will instinctively pull back the control lever. This will instantly effect a change to the reverse pitch required for braking. If, however, the pilot then ascertains that he will "overshoot" the runway and desires to circle the field again for a better landing, pushing the throttle control lever forwardly will instantly effect a change of pitch to fine pitch.

One well known control arrangement heretofore used employed a control box having two control levers, a throttle lever and a smaller auxiliary lever. The auxiliary lever was employed for effecting reverse pitch. With such an arrangement the pilot when coming in to land would pull back the auxiliary lever to effect reverse pitch for braking. If, however, he then found it was necessary to circle the field again he should first push the auxiliary lever back to neutral where it would again effect fine pitch. Frequently, the pilot in the excitement of the moment would neglect to do this and instinctively would open the throttle lever for the quick climb without first changing the propeller pitch setting from reverse pitch, thereby causing the plane to stall and crash. In accordance with the present invention this could not happen.

It is a general object of the invention to provide an "instinctive" control arrangement for aircraft having variable pitch propeller systems, whereby occurrences of the type just related cannot take place.

The invention has for another object the provision of a control system in which the amount of reverse pitch to be used for braking or diving can be set in advance by the pilot so that when the main throttle control lever, when coming in to land, is pulled rearwardly, the amount of reverse pitch for which the setting has been made, will not be exceeded. This stop arrangement also limits the power of the engine to that which the propeller can absorb at the particular reverse pitch setting chosen.

Another object of the invention resides in the provision of a control lever arrangement having mechanism which prevents the effecting of certain pitch changes at times when such pitch changes are undesirable or actually dangerous.

A further object of the invention resides in the provision in such a system of a control circuit actuated by said control mechanism.

Variable pitch propeller systems of the type to which the invention relates usually embody a main governor, driven by the engine, and operable during normal flight to maintain the engine speed as constant as is possible by varying the pitch of the propeller between coarse and fine pitch. It is a further object of the invention to provide an auxiliary governer which, in the event of a rapid opening or closing of the throttle will effect an accelerated rate of pitch change, thus preventing "over-revving" or "under-revving" of the engine under such conditions.

These and other objects of the invention will become more apparent from the following detailed description and claims when read in conjunction with the accompanying drawings in which:

Figure 3 is a section taken through the control box;

Figure 10 is a diagrammatic view of the connection of the auxiliary control lever with the auxiliary governor.

The invention is applicable to various types of variable pitch propeller systems. However, for purposes of example and clarity, it is perhaps best to refer to a definite mechanism, and for that purpose reference may be made to my copending applications, Serial No. 498,367, filed August 12, 1943 now abandoned, and Serial No. 567,991, filed December 13, 1944, now Patent No. 2,474,144 dated June 21, 1949.

Such an arrangement embodies a pair of power operated clutches for actuating the pitch changing mechanism to reverse and feathering pitches at a comparatively high rate of pitch change and an electric motor for actuating the pitch changing mechanism to predetermined coarse and fine pitch at a slower rate of pitch change. In such an arrangement it is necessary to disconnect the electric motor drive from the pitch changing mechanism when going to reverse or feathering by actuation of the power operated clutches. Moreover, when such actuation to reverse or feathering is begun, the power operated clutches must begin from a standing stop.

With reference to the control arrangement, the control levers and their connected mechanism will now be described.

In accordance with the present invention, two control levers are provided, a main control lever and an auxiliary control lever, both of which are mounted in a control box with their handle portions extending upwardly therefrom.

With reference to Figures 1, 1a, 2 and 3; a control box 10, located in the pilot's cockpit of the aircraft, is provided with a transverse shaft 11 (Figure 3) on which are mounted a number of levers for limited rotary movement about the shaft.

The control lever shown in this figure is the main control lever 12 which is also mounted for sliding movement on the shaft 11 axially thereof. The main control lever 12 extends upwardly through the upper slotted top 13 of the control box 10 and terminates in a ball handle 14. From the plan view of the slotted top 13 of the control box shown in Figure 9 it will be noted that the main control lever 12 can only slide axially of the shaft when in its neutral position in the gate indicated by the reference numeral 15.

From Figure 3 it will be noted that a lever 16 is disposed to one side of the main control lever 12 and another lever 17 is disposed on the other side of the main control lever 12. Each of the levers 16 and 17, at their upper ends, are provided with inwardly extending U-shaped portions, 18, 19, respectively, each of a width slightly larger than the width of the main control lever 12 at their level.

When the main control lever 12 is moved to one side of the gate 15 it will nest within the U-shaped portion 18 of the lever 16 and then when the main control lever 12 is pulled back (in slot 20 in Figure 9) it will move the lever 16 with it.

Likewise, if the main control lever 12 is slid on the shaft 11 to the other side of the gate 15, it will nest in the U-shaped portion 19 of lever 17, and when the main lever 12 is then pushed forwardly (in slot 21 in Figure 9) it will pivot about the shaft 11 and move lever 17 with it. It might be well at this time to point out that the main lever 12 moves only in slot 21 during normal flight and is only moved into slot 20 when it is desired to effect movement of the propeller to reverse pitch position.

Figures 1, 1A, 9:
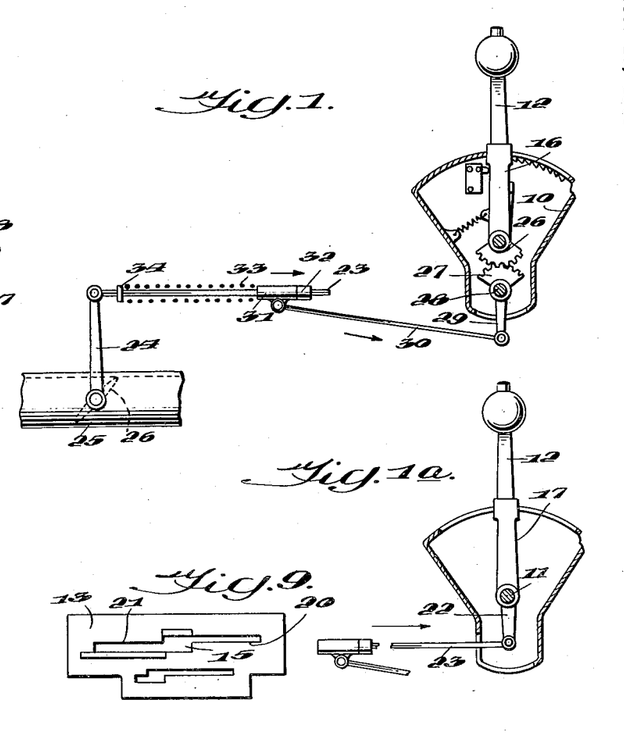
Figures 1 and 1a illustrate diagrammatically the main control lever and its connection with the throttle.
Figure 9 is a plan view of the upper surface of the control box.
Figures 7, 8, 9:
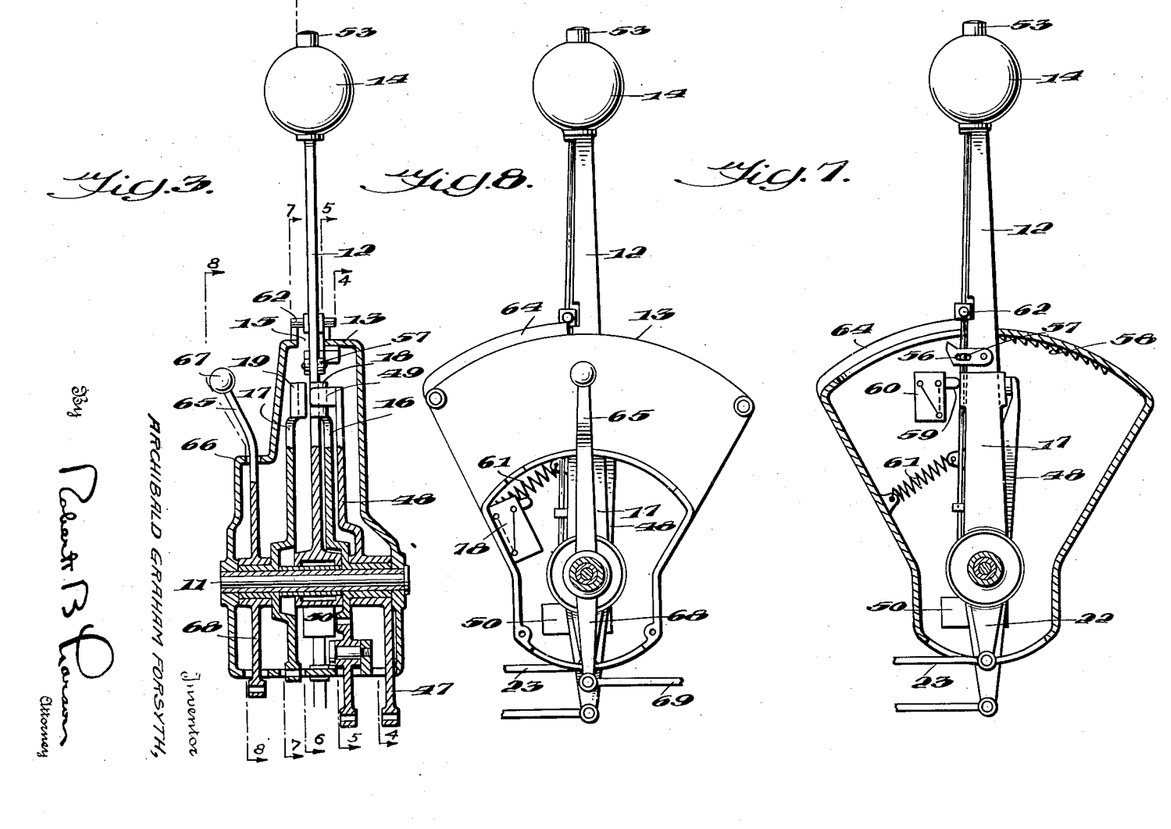
Figure 7 is a section taken on the line 7—7 of Figure 3, lever 17 being shown in elevation.
Figure 8 is a view taken on the line 8—8 of Figure 3, with the side cover removed, lever 65 being shown in elevation.

As will be seen from Figures 1a, 3 and 7, the lever 17 has a downwardly extending arm 22 to which is pivotally secured the end of a rod 23. The other end of the rod 23 (see Figures 1 and 1a) is pivotally connected to an arm 24 secured to a shaft 25 which carries the throttle valve 26 of the engine. It will be appreciated that when the main control lever 12 pushes the lever 17 forwardly (to the left in Figures 1a and 7) this will result in pulling the rod 23 to the right and opening the throttle valve 26. It is through this linkage that the throttle is controlled during normal flight, the pitch changing mechanism during such flight being under the control of the governor controlled mechanism discussed in other portions of this specification and described more fully in my above-mentioned copending applications.

Figures 4, 5:
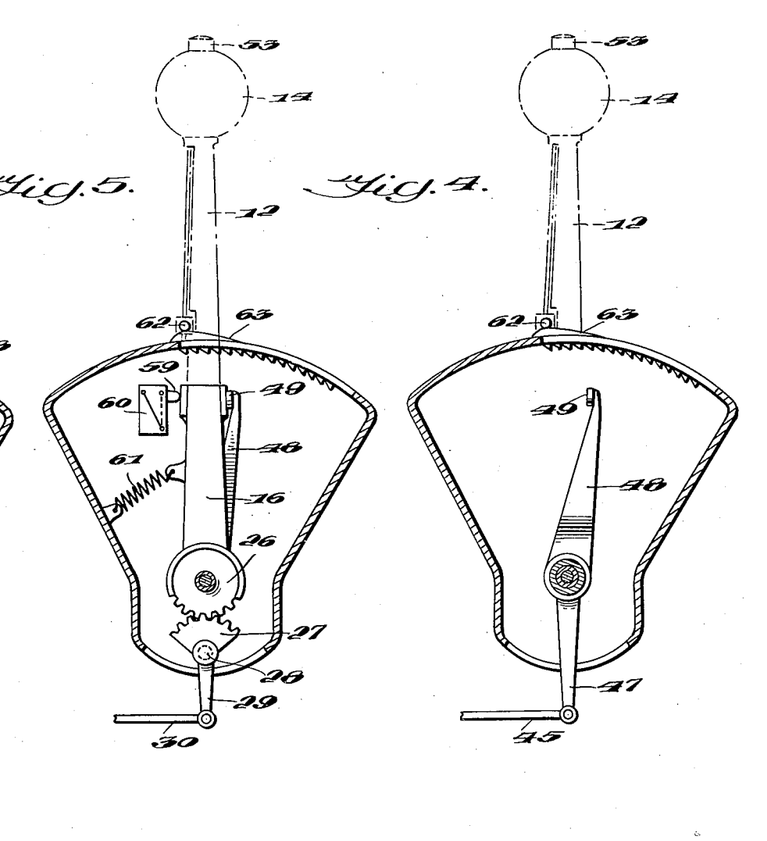
Figure 4 is a section through the control box taken on the line 4—4 of Figure 3, levers 48 and 47 being shown in elevation.
Figure 5 is a section through the control box taken on the line 5—5 of Figure 3, lever 16 and gears 26 and 27 being shown in elevation.

In Figures 1, 3 and 5 the other lever 16 has below its pivot point a quadrant gear portion 26, engaged by a quadrant gear 27 pivoted as at 28 (Figures 1, 3 and 5). The quadrant gear 27 has a downwardly extending arm 29 the end of which is pivotally connected to a rod 30. The rod at its other end is secured to the sleeve 31 on rod 23 (see Figure 1). A stop 32 rigid with the rod 23 limits sliding movement of the sleeve in one direction and a spring 33 is disposed on the rod 23 between the sleeve 31 and a collar 34.

When the main control lever 12 is pulled rearwardly (to the right in Figure 1), it pulls the lever 16 rearwardly with it and the rod 30 will be moved in the direction of the arrow in Figure 1. Consequently, rod 23 will be pulled to the right and the throttle valve 26 will be thus opened. It is through this linkage that the throttle is controlled when the lever 12 is in slot 20 and the propeller is in reverse pitch position.

It should be manifest from the above that movement of the main control lever 12 from its neutral (gate) position in either a forward or a rearward direction will result in opening of the throttle valve 26 of the aircraft engine.

It should be explained at this point that, in accordance with the invention, pulling of the main control lever 12 rearwardly effects a change of pitch of the propeller to reverse pitch for braking or diving. The manner in which this is effected will be described hereinafter.

Figures 1B, 2:
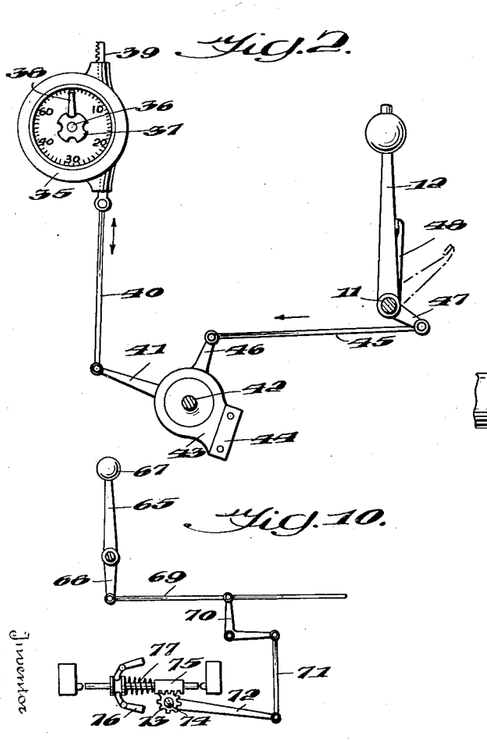
Figure 2 is a diagrammatic illustration of the reverse pitch setting indicator and its connection with the main control lever.

It has been found desirable to provide an adjustable limit stop for the rearward path of travel of the main control lever 12. Thus, the power of the engine may be limited to that which the propeller will absorb at the particular reverse pitch setting selected. The mechanism for limiting such rearward movement of the main control lever is as follows:

With reference to Figure 2, the reference numeral 35 represents a pitch setting indicator having a dial graduated in degrees from "0" to "60." A shaft 36 has a knob 37 and a pointer 38 secured thereto. The shaft 36 behind the dial has a gear thereon which engages a rack 39 disposed tangentially with respect to the indicator casing and mounted for axial sliding movement. One end of the rack 39 is secured to a rod 40 which in turn is pivotally connected at its other end to one arm 41 of a double armed lever secured to a rotatable shaft 42. The shaft 42 is mounted in a casing 43 which carries a reverse pitch limit switch 44 which may conveniently be of the adjustable type described in my above-mentioned copending application Serial No. 567,991, filed December 13, 1944.

A rod 45 is pivotally connected at one of its ends to the other arm 46 of the double armed lever. This rod 45, at its opposite end, is pivotally joined to an arm 47 forming a part of stop lever 48. From Figure 3 it will be seen that the stop lever 48 is mounted for swinging movement about the shaft 11 in the control box 10. The upper arm of the stop lever 48 is provided with a lateral lug 49 which projects into the path of both the main control lever 12 and the lever 16. This lug 49 depending on the position of the stop lever 48 will limit the rearward path of travel of the main control lever 12 and of the lever 16.

The operation of this throttle stop should now be clear. The pilot by turning the knob 37 on the indicating mechanism 35 (Figure 2) moves the pointer 38 to the number of degrees of reverse pitch desired for a particular braking or diving operation. Turning of the knob 37 also rotates the pinion secured to shaft 36 behind the dial which moves the rack 39 downwardly a corresponding amount. Through the rods 40, 41 the shaft 42 is also turned and the switch 44 is thus set to shut off the pitch changing mechanism at the degree of reverse pitch chosen. The shaft 42 in turning moves arm 46 to the left, drawing rod 45 and arm 47 of the stop lever 48 also to the left. This results in moving the upper arm of the stop lever 48 rearwardly (to right in Figures 2 and 4) a distance corresponding to the throttle opening required to give the power which the propeller will absorb in the reverse pitch setting indicated by the pointer on the dial of the indicating mechanism.

Figure 6:
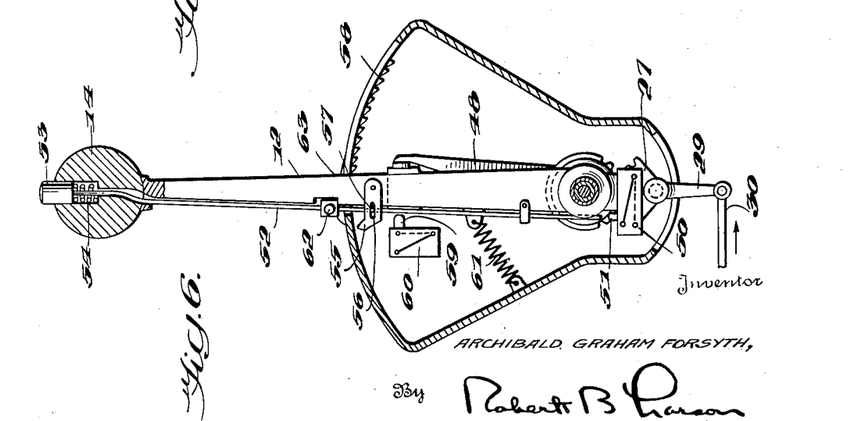
Figure 6 is a section taken on the line 6—6 of Figure 3, button 53 and most of lever 12 and its hub being shown in elevation.

Figure 6 is a section through the control box showing the main control lever 12. It will be observed that the portion of this lever below the pivot point (the shaft 11) carries a fine pitch switch mechanism 50. This switch mechanism has a button 51 which when depressed will throw the switch to vary the pitch of the propeller toward fine pitch position.

The switch button 51 is adapted to be depressed by a rod 52 carried on the side of the main control lever 12, and capable of longitudinal movement. The upper end of the rod 52 passes into the ball handle 14 and terminates in an operating button 53 which is urged upwardly by the spring 54. It should be apparent now that depressing the operating button 53 will, through rod 52, depress switch button 51 and actuate the fine pitch switch 50.

The main control lever 12 has a pawl 55 pivoted thereto and this pawl 55 is provided with a slot 56 in which is engaged a pin 57 rigid with the rod 52. The underside of the top 13 of the control box 10 adjacent the slot 20 (Figure 9) in which the control lever 12 may be pulled rearwardly is provided with a ratchet 58 which will be engaged by the pawl 55 so as to prevent subsequent forward motion of the control lever 12 unless the operating button 53 is depressed. Depression of this button 53 will cause pin 57 to move downwardly, thus pivoting the pawl 55 out of engagement with the ratchet 58, thus permitting the control lever 12 to again be moved forwardly (to the left in Figure 6.

It has already been explained that the control lever 12 when pulled rearwardly for reverse pitch, will carry with it lever 16. This lever 16 (see Figure 6) in its normal position, as shown, engages an actuating button 59 of a switch mechanism 60. This switch mechanism 60 is such that when the lever 16 is moved rearwardly (to the right in Figure 6), it will leave the switch which will then snap to close a circuit effecting a change of pitch to reverse pitch. The lever 16 is urged to its normal position by the spring 61. Thus when the lever 12 is in slot gate 15 or slot 21, the reverse pitch switch 60 is open due to the urging of lever 16 to switch closing position by spring 61.

It has also been described that the main control lever 12 may be moved from its central or gate position forwardly (to the left in Figures 6, 7 and 8). In doing so it rides in the slot 21 (Figure 9) and carries with it the lever 17 which actuates the throttle. An arrangement has been provided to prevent the pilot from depressing the operating button 53 in the handle, during such forward movement of the control lever 12.

With reference to Figures 3, 6 and 8, it will be noted that the rod 52 actuated by the operating button 53 carries a transverse stud 62 which extends laterally on each side of the rod 52. The length of the stud 62 is greater than the width of any of the slots 20, 21, in the top 13 of the control box 10, and, in fact, is greater than the width of the gate 15.

When the main control lever 12 is moved rearward (to right in Figure 6) the stud 62 rides on the top surface 13 of the control box.

If the pilot subsequently depresses the operating button 53 and pushes the main control lever 12 forwardly to the gate 15 and then forwardly in the same direction (to left in Figure 6), the pilot may unintentionally keep on depressing the operating button 53. The arrangement shown, however, makes this impossible. As the control lever 12 reaches the neutral or gate position the stud 62 rides up on a cam 63. This forces the rod 52 and operating button upwardly breaking the circuit which had moved the propeller blades toward fine pitch position.

As the main control lever 12 then moves across the gate 15 and continues its forward movement (in slot 21, Figure 9), the stud 62, which has been so raised, will ride on the raised ledge 64 as shown in Figures 8 and 9.

It will be appreciated, therefore, that when moving the control lever 12 from reverse pitch position, forwardly, the pilot-depressed operating button 53 will, because of cam 63 and the raised ledge 64, automatically be raised to and maintained in inoperative position. Consequently, the pilot can not even unintentionally actuate the switch mechanism 50 to fine pitch position during forward movement of the control lever since the operating button 53 during that time is forceably kept in its upmost position.

With reference now to the auxiliary lever, attention is directed to Figures 3, 8 and 10. The auxiliary control lever 65 is also mounted for limited rotation on the shaft 11. It extends upwardly through the upper slotted surface of the ledge 66 of the control box 10 and is provided with a ball handle 67.

The auxiliary control lever 65 has a lower arm 68, the lower end of which is pivotally connected to a rod 69, which is connected to the main governor (not shown) of the system. The rod 69 also connects with one arm of a double-armed lever 70 (Figure 10) which has a fixed pivot axis. The other arm of the double-armed lever 70 is connected by a link 71 to a lever arm 72. The lever arm 72 is rigid with a shaft 73 and the shaft has a pinion 74 mounted thereon. The pinion 74 engages a rack 75 slidable on a spindle which is part of the auxiliary governor generally indicated by 76. This auxiliary governor includes a tension spring 77 for adjusting the governor and the tension of the spring 77 is controlled by the position of the rack 75.

The rod 69 which extends to the main governor is similarly connected so as to adjust the spring of the main governor (not shown) in the same manner. In this manner, actuation of the auxiliary control lever 65 effects similar adjustment of both the main and auxiliary governors.

The auxiliary control lever 65 is also employed in one of its positions to close the switch 78 (Figure 8) which establishes a circuit for effecting a pitch change to feathering pitch.

Figure 11:
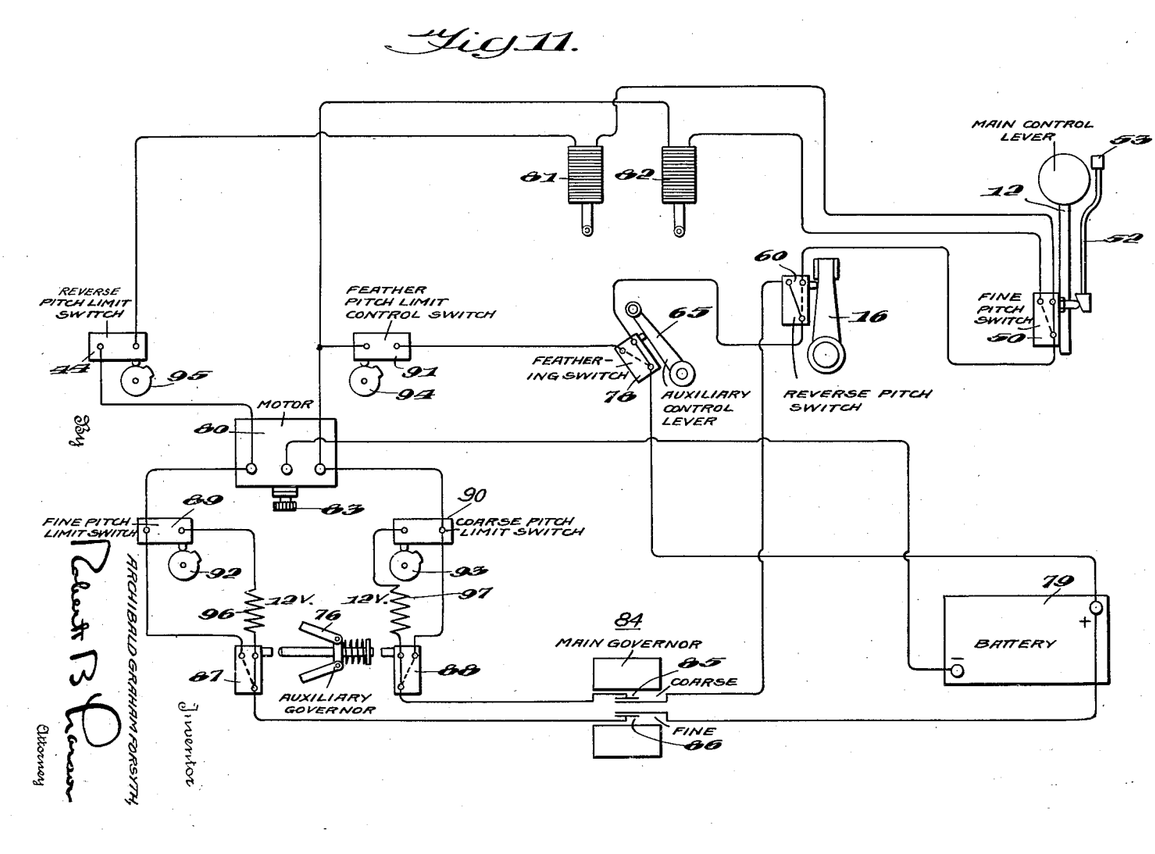
Figure 11 is a diagrammatic view of an electric circuit for use with the invention.

Figure 11 shows diagrammatically a circuit diagram which can be employed with the apparatus described. In this figure the reference numeral 79 indicates a battery capable of 24 volts. This battery 79 is adapted under predetermined conditions to energize a reversible electric motor 80 and the solenoids 81 and 82.

The electric motor 80 and the solenoids 81, 82 are connected to actuate the pitch changing mechanism (not shown). The particular type of pitch changing mechanism, in connection with which the invention may be employed, is not a part of this invention. In my above mentioned copending applications, an electric motor, similar to the motor 80 of this application, is employed to actuate the pitch changing mechanism to fine and to coarse pitch (depending on the direction of the electric motor), and solenoids, similar to the solenoids 81 and 82, are adapted to actuate clutches connected through gearing to be driven from the propeller drive shaft. One of the clutches effects a pitch change to reverse pitch and the other to feathering. The arrangement is such that the changes effected by the electric motor are carried out at a slower rate than those carried out by the clutches.

In accordance with the present invention the electric motor 80 is provided with a pinion 83 which is adapted to drive the pitch changing mechanism (not shown) to fine or to coarse pitch. The solenoid 81 is adapted when energized to actuate a power driven clutch (not shown) for effecting a pitch change to reverse pitch, and the other solenoid 82 similarly effects a pitch change from reverse pitch back to fine pitch.

In the circuit there are several elements not heretofore described. The main governor 84 is provided with a coarse pitch switch 85 and a fine pitch switch 86. The auxiliary governor 76 is adapted to actuate switches 87 and 88, the purpose of which will be described shortly.

The circuit includes a fine pitch limit switch 89, a coarse pitch limit switch 90 and a feathering pitch limit switch 91. The reverse pitch limit switch 44 has already been mentioned. All four of these limit switches are adapted to be actuated by cams 92, 93, 94 and 95, respectively, which are actuated by means (not shown) to turn as soon as a pitch change begins, and actuate their respective switches when the predetermined pitch limits have been reached. As previously explained the point at which the reverse pitch limit switch 44 will cut-off may be adjusted through operation of the knob 37 on the indicating mechanism 35 (Figure 2). For a more detailed discussion of the limit switches, reference is again made to my above mentioned copending applications.

The main governor 84 may be of any known type as will operate in accordance with the speed of the aircraft engine.

The operation of the circuit will now be described:

Under normal flight conditions the main governor 84 will maintain the speed of the aircraft engine substantially constant. If the speed of the engine increases or decreases the fine pitch switch 86 or the coarse pitch switch 85 will be closed, thus effecting the pitch change necessary to restore the engine speed to normal.

It will be noted that the fine pitch line from the main governor 84 extends through the switch 87 of the auxiliary governor 76, thence through resistance 96 to the fine pitch limit switch 89, and through that switch to the electric motor 80. Similarly the coarse pitch line from the main governor 84 extends through switch 88, resistance 97, through the coarse pitch limit switch 90 to the electric motor. The resistances 96 and 97 are such that when the circuit passes through them, the electric motor 80 is energized by 12 volts.

In the event the pilot suddenly decreases or increases the engine speed, the auxiliary governor 76 will operate either switch 87 or 88, so that the particular resistance 96 or 97 is shunted and the electric motor 80 is energized with 24 volts, thus effecting a much more rapid pitch change to coarse or fine pitch as the case may be. It can be appreciated that the auxiliary governor 76 thus prevents "over-revving" or "under-revving" of the engine upon sudden changes of speed by doubling the rate of pitch change to fine or coarse.

Assuming that the pilot desires to go into a dive, the main control lever 12 is pulled rearwardly and lever 16 moves with it (to the right in Figure 5). In doing so, lever 16 leaves the reverse pitch switch 60 which snaps over to complete a circuit through solenoid 81, thus actuating the power clutch (not shown) associated with this solenoid 81. A change to reverse pitch is thus effected.

The same conditions pertain to landing when reverse pitch is used for braking. In both of these conditions it will be recalled that the amount of reverse pitch to be used in diving or braking, and the proper throttle limit for such reverse pitch can be set by the pilot in advance by turning the knob 37 on the indicating mechanism 35.

Assuming that the pilot has misjudged the landing and desires quickly to rise and circle the field again. Instinctively he will push the main control lever 12 forwardly, but the propeller is still in reverse pitch and such a condition for safety requires an immediate change to fine pitch. If the main control lever 12 could be pushed forwardly while the propeller is in reverse pitch, a crash would undoubtedly result. In accordance with the invention, in order to push the main control lever 12 forwardly, to neutral or gate position, the pilot must first depress the operating button 53. This releases the pawl 55 from the ratchet 58 (Figure 6) and at the same time actuates the fine pitch switch 50 immediately to break the reverse pitch circuit and energize the fine pitch circuit. Thus, by the time the main control lever 12 is back to neutral position, the propeller is in fine pitch. Then by pushing the main control lever 12 forwardly (to left in Figures 6 and 7) full throttle can be applied for a quick rise.

The auxiliary lever 65, as mentioned, is used for two purposes, first, for actuating the switch 78 to establish a circuit for effecting feathering pitch, and secondly, for adjusting the tension on the springs of both the main and auxiliary governors.

It will be observed that the arrangement illustrated described provides a control which is actuated by instinctive movements of the pilot and which at the same time is foolproof preventing the pilot from moving the main control lever in such manner as to result in a dangerous stalling condition.

It will be apparent that changes in the structure and arrangement of the parts may be made without departing from the invention which is only to be limited in scope as indicated by the following claims.

What I claim is:

1. A control mechanism for aircraft having a variable pitch propeller rotated by an engine under the control of a throttle, said mechanism comprising a control lever mounted for movement from a neutral to forward and rearward positions and connected to open the throttle of the aircraft engine when moved either forwardly or rearwardly from neutral, means for effecting a pitch changing movement of said propeller towards reverse pitch position immediately said control lever is moved from its neutral position rearwardly, means for locking said control lever against movement from a rearward position towards its neutral position, means on said control lever for effecting release of said locking means, and means including an electric switch operated simultaneously by said releasing means for effecting pitch changing movement of said propeller toward fine pitch position.

2. A control mechanism for aircraft having a variable pitch propeller rotated by an engine under the control of a throttle, said mechanism comprising a control lever mounted for movement from a neutral to forward and rearward positions and connected to open the throttle of the aircraft engine when moved either forwardly or rearwardly from neutral, means for effecting a pitch changing movement towards reverse pitch position immediately said control lever is moved from its neutral position rearwardly, means for locking said control lever against movement from a rearward position towards its neutral position, means on said control lever for effecting release of said locking means, means including an electric switch operated simultaneously by said releasing means for effecting pitch changing movement toward fine pitch position, and means for setting in advance the limit of reverse pitch to be effected for a given operation.

3. A control mechanism for aircraft having a variable pitch propeller rotated by an engine under the control of a throttle, said mechanism comprising a control lever mounted for movement from a neutral to forward and rearward positions and connected to open the throttle of the aircraft engine when moved either forwardly or rearwardly from neutral, means for effecting a pitch changing movement towards reverse pitch position immediately said control lever is moved from its neutral position rearwardly, means for locking said control lever against movement from a rearward position towards its neutral position, means on said control lever for effecting release of said locking means, means operated simultaneously by said releasing means for effecting pitch changing movement toward fine pitch position, and means for blocking actuation of said releasing means, and thereby preventing operation of said means for effecting pitch changing movement toward fine pitch position, when said control lever is located between its neutral and its extreme forward position.

4. A control mechanism for aircraft having a variable pitch propeller rotated by an engine under the control of a throttle, said mechanism comprising, a control lever having an operating handle and mounted for pivoting movement from a neutral to forward and rearward positions, means connecting said control lever to open the throttle of the aircraft engine when moved either forwardly or rearwardly from its neutral position, said last named means including a second lever movable with said control lever between its neutral and rearward positions, means actuated by movement of said second lever toward a rearward position to effect a pitch changing movement toward reverse pitch positions, means for locking said control lever and said second lever against movement from a rearward position toward neutral position, means on said control lever for effecting release of said locking means, and means including an electric switch operated simultaneously by said releasing means for effecting pitch changing movement toward fine pitch position.

5. A control mechanism for aircraft having a variable pitch propeller rotated by an engine under the control of a throttle, said mechanism comprising, a control lever having an operating handle and mounted for pivoting movement from a neutral to forward and rearward positions, means connecting said control lever to open the throttle of the aircraft engine when moved either forwardly or rearwardly from its neutral position, said last named means including a second lever movable with said control lever between its neutral and rearward positions, means actuated by movement of said second lever toward a rearward position to effect a pitch changing movement toward reverse pitch position, means for locking said control lever and said second lever against movement from a rearward position toward neutral position, means on said control lever for effecting release of said locking means, means operated simultaneously by said releasing means for effecting pitch changing movement toward fine pitch position, and means for setting in advance the limit of reverse pitch to be effected for a given operation, said limiting means including an adjustable stop member disposed in the rearward path of said control and second levers.

6. A control mechanism for aircraft having a variable pitch propeller rotated by an engine under the control of a throttle, said mechanism comprising, a control lever having an operating handle and mounted for pivoting movement from a neutral to forward and rearward positions, means connecting said control lever to open the throttle of the aircraft engine when moved either forwardly or rearwardly from its neutral position, said last named means including a second lever movable with said control lever between its neutral and rearward positions, means actuated by movement of said second lever toward a rearward position to effect a pitch changing movement toward reverse pitch position, means for locking said control lever and said second lever against movement from a rearward position toward neutral position, means on said control lever for effecting release of said locking means, means operated simultaneously by said releasing means for effecting pitch changing movement toward fine pitch position, and means for blocking actuation of said simultaneously operable means when said control lever is being moved between neutral and a forward position.

7. A control mechanism for aircraft having a variable pitch propeller rotated by an engine under the control of a throttle, said mechanism comprising, a control lever having an operating handle and mounted for pivoting movement from a neutral to forward and rearward positions, means connecting said control lever to open the throttle of the aircraft engine when moved either forwardly or rearwardly from its neutral position, said last named means including a second lever movable with said control lever between its neutral and rearward positions, a third lever movable with said control lever between its neutral and forward positions, and means operably connecting said second and third levers with said throttle, means actuated by movement of said second lever toward a rearward position to effect a pitch changing movement toward reverse pitch position, means for locking said control lever and said second lever against movement from a rearward position toward neutral position, means on said control lever for effecting release of said locking means, and means operated simultaneously by said releasing means for effecting pitch changing movement toward fine pitch position.

8. A control mechanism for aircraft having a variable pitch propeller rotated by an engine under the control of a throttle, said mechanism comprising, a control box, a shaft in said box, a control lever having an operating handle extending outside of said box and mounted on said shaft for pivoting movement from a neutral to forward and rearward positions, means connecting said control lever to open the throttle of the aircraft engine when moved either forwardly or rearwardly from its neutral position, said last named means including a second lever mounted on said shaft and movable with said control lever between its neutral and rearward positions, a third lever mounted on said shaft and movable with said control lever between its neutral and forward positions, and means operably connecting said second and third levers with said throttle, means actuated by movement of said second lever toward a rearward position to effect a pitch changing movement toward reverse pitch position, means for locking said control lever and said second lever against movement from a rearward position toward neutral position, means on said control lever for effecting release of said locking means, and means operated simultaneously by said releasing means for effecting pitch changing movement toward fine pitch position, said control lever being mounted on said shaft between said second and third levers and being selectively movable axially of the shaft into operative engagement with either said second or third lever.

9. A control mechanism for aircraft having a variable pitch propeller rotated by an engine under the control of a throttle, said mechanism comprising, a control box, a shaft in said box, a control lever having an operating handle extending outside of said box and mounted on said shaft for pivoting movement from a neutral to forward and rearward positions, means connecting said control lever to open the throttle of the aircraft engine when moved either forwardly or rearwardly from its neutral position, said last named means including a second lever mounted on said shaft and movable with said control lever between its neutral and rearward positions, a third lever mounted on said shaft and movable with said control lever between its neutral and forward positions, and means operably connecting said second and third levers with said throttle, means actuated by movement of said second lever toward a rearward position to effect a pitch changing movement toward reverse pitch position, means for locking said control lever and said second lever against movement from a rearward position toward neutral position, means on said control lever for effecting release of said locking means, means operated simultaneously by said releasing means for effecting pitch changing movement toward fine pitch position, said control lever being mounted on said shaft between said second and third levers and being selectively movable axially of the shaft into operative engagement with either said second or third lever, means for setting in advance the limit of reverse pitch to be effected for a given operation, said limiting means including a stop lever pivoted on said shaft and having a lateral lug disposed in the rearward path of said control and second levers.

10. A control mechanism for aircraft having a variable pitch propeller rotated by an engine under the control of a throttle as defined in claim 8, said control box having a slotted top through which said control lever extends, said locking means comprising a pawl carried by the control lever just below said top and a ratchet on the underside of the top.

11. A control mechanism for aircraft having a variable pitch propeller rotated by an engine under the control of a throttle as defined in claim 8, said control box having a slotted top through which said control lever extends, said locking means comprising a pawl carried by the control lever just below said top and a ratchet on the underside of the top, and said simultaneously operable means including an operating button on the operating handle and connected by a rod to actuate a switch carried by the control lever, and means on said rod operative to disengage the pawl from the ratchet when the operating button is depressed.

12. A control mechanism as defined in claim 9 in which said variable pitch propeller is electrically operable and in which a reverse pitch limit switch is provided for terminating pitch changing movement of said propeller when a preselected reverse pitch position has been reached, said setting means including a dial, an operating knob for turning a pointer on said dial, and mechanism actuated by the knob for simultaneously setting the terminating position of said reverse pitch limit switch and adjusting the position of said stop lever.

13. A control mechanism for aircraft having an electrically operable variable pitch propeller rotated by an engine under the control of a throttle, said mechanism comprising, a control lever having an operating handle and mounted for pivoting movement from a neutral to forward and rearward positions, means connecting said control lever to open the throttle of the aircraft engine when moved either forwardly or rearwardly from its neutral position, said last named means including a second lever movable with said control lever between its neutral and rearward positions, a reverse pitch switch actuated by movement of said second lever toward a rearward position to effect a pitch changing movement toward reverse pitch position, means for locking said control lever and said second lever against movement from a rearward position toward neutral position, means on said control lever for effecting release of said locking means, and a fine pitch switch operated simultaneously by said releasing means for effecting pitch changing movement toward fine pitch position.

14. A control mechanism for aircraft having an electrically operable variable pitch propeller rotated by an engine under the control of a throttle, said mechanism comprising, a control box, a shaft in said box, a control lever having an operating handle extending outside of said box and mounted on said shaft for pivoting movement from a neutral to forward and rearward positions, means connecting said control lever to open the throttle of the aircraft engine when moved either forwardly or rearwardly from its neutral position, said last named means including a second lever mounted on said shaft and movable with said control lever between its neutral and rearward positions, a third lever mounted on said shaft and movable with said control lever between its neutral and forward positions, and means operably connecting said second and third levers with said throttle, means actuated by movement of said second lever toward a rearward position to effect a pitch changing movement toward reverse pitch position, means for locking said control lever and said second lever against movement from a rearward position toward neutral position, means on said control lever for effecting release of said locking means, means operated by said releasing means for effecting pitch changing movement toward fine pitch position, said control lever being mounted on said shaft between said second and third levers and being selectively movable axially of the shaft into operative engagement with either said second or third lever, an auxiliary control lever pivotally mounted on said shaft and having an operating handle extending outside of the control box, and a feathering switch disposed in said control box for actuation by said auxiliary control lever and operable to cause movement of said propeller to feathering pitch position.

15. A control mechanism for aircraft having an electrically operable variable pitch propeller rotated by an engine having a governor and being under the control of a throttle, said mechanism comprising, a control box, a shaft in said box, a control lever having an operating handle extending outside of said box and mounted on said shaft for pivoting movement from a neutral to forward and rearward positions, means connecting said control lever to open the throttle of the aircraft engine when moved forwardly or rearwardly from its neutral position, said last named means including a second lever mounted on said shaft and movable with said control lever between its neutral and rearward positions, a third lever mounted on said shaft and movable with said control lever between its neutral and forward positions, and means operably connecting said second and third levers with said throttle, means actuated by movement of said second lever toward a rearward position to effect a pitch changing movement toward reverse pitch position, means for locking said control lever and said second lever against movement from a rearward position toward neutral position, means on said control lever for effecting release of said locking means, means operated simultaneously by said releasing means for effecting pitch changing movement toward fine pitch position, said control lever being mounted on said shaft between said second and third levers and being selectively movable axially of the shaft into operative engagement with either said second or third lever, an auxiliary control lever pivotally mounted on said shaft and having an operating handle extending outside of the control box, a feathering switch disposed in said control box for actuation by said auxiliary control lever in one of its positions of movement to cause movement of said propeller to feathering pitch position, and means connecting said auxiliary lever to said governor for adjusting the governor.

16. A control mechanism for aircraft having a variable pitch propeller rotated by an engine under the control of a throttle, said mechanism comprising, a control lever having an operating handle and mounted for pivoting movement from a neutral to forward and rearward positions, means connecting said control lever to open the throttle of the aircraft engine when moved either forwardly or rearwardly from its neutral position, said last named means including a second lever movable with said control lever between its neutral and rearward positions, means actuated by movement of said second lever toward a rearward position to effect a pitch changing movement toward reverse pitch position, means for locking said control lever and said second lever against movement from a rearward position toward neutral position, means on said control lever for effecting release of said locking means, means operated simultaneously by said releasing means for effecting pitch changing movement toward fine pitch position, and means for biasing said second lever toward its neutral position.

ARCHIBALD GRAHAM FORSYTH.

REFERENCES CITED

The following references are of record in the file of this patent:

UNITED STATES PATENTS

| Number | Name | Date |
| --- | --- | --- |
| 1,374,787 | Walker | Apr. 12, 1921 |
| 1,427,830 | McCauley | Sept. 5, 1922 |
| 1,455,431 | Dicks | May 15, 1923 |
| 1,693,451 | McCauley et al. | Nov. 27, 1928 |
| 1,935,620 | Dickey | Nov. 21, 1933 |
| 2,179,492 | Caldwell et al. | Nov. 14, 1939 |
| 2,382,707 | Gosslau et al. | Aug. 14, 1945 |
| 2,412,360 | Schorn | Dec. 10, 1946 |
| 2,423,191 | Kapp | July 1, 1947 |
| 2,474,144 | Forsyth | June 21, 1949 |